US007339889B2

(12) United States Patent
Lee et al.

(10) Patent No.: US 7,339,889 B2
(45) Date of Patent: Mar. 4, 2008

(54) CONTROL PLANE ARCHITECTURE FOR AUTOMATICALLY SWITCHED OPTICAL NETWORK

(75) Inventors: Yang Sup Lee, Gloucester (CA); Dan Oprea, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1037 days.

(21) Appl. No.: 10/401,552

(22) Filed: Mar. 31, 2003

(65) Prior Publication Data

US 2003/0235153 A1   Dec. 25, 2003

Related U.S. Application Data

(60) Provisional application No. 60/389,951, filed on Jun. 20, 2002.

(51) Int. Cl.
*G01R 31/08* (2006.01)
(52) U.S. Cl. .................... 370/230; 370/235; 370/252
(58) Field of Classification Search ............. 370/230, 370/229, 235, 252, 253
See application file for complete search history.

(56) References Cited

U.S. PATENT DOCUMENTS

| 6,026,425 | A * | 2/2000 | Suguri et al. ............... 718/105 |
| 6,038,218 | A * | 3/2000 | Otsuka et al. .............. 370/236 |
| 6,707,792 | B1 * | 3/2004 | Volftsun et al. ............ 370/235 |
| 6,977,943 | B2 * | 12/2005 | Zboril ......................... 370/429 |
| 2003/0021222 | A1 * | 1/2003 | Boer et al. .................. 370/216 |
| 2003/0214962 | A1 * | 11/2003 | Allaye-Chan et al. ...... 370/406 |

OTHER PUBLICATIONS

Shortest-Cycle Photonic Network Restoration; K J Warbrick, X Lu, R. Friskney and K Durrani Nortel Networks UK Limited; [online]; [retrieved on Dec. 6, 2001]; <URL: http://www.ee.ucl.ac.uk/lcs/prog01/LCS031.pdf>.
Fault Tolerance in Optical Networks; Mir Hussain Ali; [online]; [retrieved on Dec. 6, 2001]; <URL: http://hamsa.unl.edu/~mhali/Fault.ppt>.
Draft G. astn (V0.51); Michael Mayer; Nortel Network; [online]; Mar. 22, 2001 [retrived on May 28, 2003]; <URL: ftp://ftp.tl.org/T1X1/2001x15/1x151000.doc>.

* cited by examiner

*Primary Examiner*—Ricky Q. Ngo
*Assistant Examiner*—Kibrom T Hailu
(74) *Attorney, Agent, or Firm*—Jeffrey M. Measures; Borden Ladner Gervais LLP

(57) ABSTRACT

Methods and apparatus are provided for bandwidth management within Automatically Switched Optical Networks. An Optical Connection Controller (OCC) provides threshold based load balancing using an upper and a lower threshold for each port of a network element, and once port usage exceeds the upper threshold no more connections are allowed through the port until the port usage falls below the lower threshold. The OCC also minimizes fragmentation of a port so as to reduce the probability of call rejection as a result of fragmentation. The OCC also maintains a database of shortest paths between a network element and each destination, so that connections can be re-established quickly through alternate paths in the event of failure of a link or node. The OCC also provides the entire network with notification of a fault, thereby enhancing CR-LDP fault notification messaging.

10 Claims, 5 Drawing Sheets

CONTROL PLANE ARCHITECTURE FOR AUTOMATICALLY SWITCHED OPTICAL NETWORK

CROSS-REFERENCE TO RELATED APPLICATIONS

This application claims priority from U.S. Patent Application 60/389,951 filed on Jun. 20, 2002 by the same applicants as the present application.

FIELD OF THE INVENTION

This invention relates to automatically switched optical networks, and more particularly to management of bandwidth usage within such networks.

BACKGROUND OF THE INVENTION

In optical networks, connections are set up and removed upon request of a customer. In existing networks, this is a manual and slow process, and as a result connections are usually established for long periods of time. In order to provide customers with bandwidth-on-demand, connection management will have to be carried out by automated means.

ITU Telecommunications Standardization Sector Study Group 13, "Requirements for the Automatic Switched Transport Network G.807/Y.1301 V1.0", Caracas, May 14-25 2001, Ed. Michael Mayer, and ITU Telecommunications Standardization Sector Study Group 15, "Architecture for the Automatic Switched Optical Network (ASON) G.8080/Y.1304 V1.0", Geneva, Oct. 15-26 2001 are a set of standards being developed for automatically switched optical networks (ASON). A transport network will be used to carry customer traffic. The transport network will contain interconnected network elements. The network elements will be connected by links of optical fibre entering the network elements at ports. An ASON control plane will provide connection management services to the transport network. The ASON control plane will include Optical Connection Controllers (OCCs) on which connection management software will run. Each OCC may be linked to one or more network elements through Connection Control Interfaces.

One aspect of connection management is bandwidth control. One problem in bandwidth control is load balancing. It is important that a port not be overused. While the OCCs should select a path for a connection having low metrics (such as cost or distance), the OCCs should also avoid selecting a path through a port that is near its maximum capacity. A simple threshold test can be used, but this may lead to a lot of signalling between the network element on which the port is located and an OCC as the amount of traffic through the port fluctuates around the threshold.

Another problem in bandwidth control is fragmentation. Fragmentation occurs when concatenated SONET payloads of different sizes are allocated and released on a SONET port. Each connection must be allocated to contiguous time slots. If the slot assignment and release is performed arbitrarily, some free slots may exist between assigned slots. In such a case, there may not exist sufficient free contiguous slots to accommodate a high capacity SONET connection request, even though there may be sufficient free slots in total, and the connection request will be rejected. For example, four STS-1 requests may have been assigned to slots 1, 49, 97, and 145 of an OC192 port (having 192 slots in total). Although the total number of free slots is 188, a new STS-48c request cannot be accommodated because there are no contiguous 48 free slots.

In addition, a standard may specify that certain concatenated payload types can only be assigned to certain slots. For example, an STS-12c connection can only start at slots 1, 13, 25, 37, etc. An STS-48c connection can only start at slots 1, 49, 97, or 145 (on an STS-192 port). For such payload types, a connection may be rejected even if there are sufficient contiguous free slots to accommodate the connection. For example, if STS-1 slots had been assigned to slots 2, 96, 97, and 145, an STS-48c connection cannot be accommodated despite the 93 contiguous slots from slot 3 to slot 95. The STS-48c connection would have to begin at slot 49, but would require slot 96 to be free.

Another aspect of connection management is fault notification and path restoration. When a link between two network elements fails, the ASON control plane must be notified of the fault. In particular, source nodes for connections interrupted by the fault must be notified, so that new paths can be determined to restore the connections. Under the currently proposed method of fault notification, the OCC responsible for a network element terminating the link determines the source nodes of the connections affected by the fault. The OCC then sends a control plane message to the source nodes using standard signalling (for example, using the Constraint based Routing Label Distribution Protocol), notifying the source nodes of the fault. While this results in a low amount of targeted fault notification, the determination of the source nodes takes time.

Once the ASON control plane is notified of a fault, a new path must be established to replace the path interrupted as a result of the fault.

SUMMARY OF THE INVENTION

The present invention provides a method of determining an acceptability of a port for a new connection in an Automatically Switched Optical Network. If the current port load is below a lower threshold, the OCC determines that the port is acceptable. If the current port load is above an upper threshold, the OCC determines that the port is not acceptable. If the current port load is between the lower threshold and the upper threshold, the OCC determines whether the current port load was most recently above the upper threshold or below the lower threshold. If the current load was more recently above the upper threshold, the OCC determines that the port is not acceptable. Otherwise, the OCC determines that the port is acceptable.

In one embodiment, the OCC determines whether the current load was most recently above the upper threshold or below the lower threshold by maintaining a value of a flag. Whenever the current port load falls below the lower threshold, the OCC sets the value of the flag to a first value. Whenever the current port load reaches the upper threshold, the OCC sets the value of the flag to a second value. Thereafter, if the value of the flag is equal to the first value the OCC determines that the current port load was most recently below the lower threshold, and if the value of the flag is equal to the second value the OCC determines that the current port load was most recently above the upper threshold.

In one embodiment the current port load is determined by signalling a network element on which the port is located. In another embodiment, the OCC maintains a port load database for storing the current port load. The current port load is determined by consulting the port load database using the port as an index. The port load database may be updated to take into account newly established connections. The port load database may include one current port load for each of a number of destinations, in which case a destination of the connection is used as an index when consulting the port load database. There may also be one lower threshold for each destination, in which case the lower threshold is selected from a database of lower thresholds using the destination of the connection as an index.

Similarly, the port load database may include one current port load for each of a number of paths, in which case a path of the connection is used as an index when consulting the port load database. There may also be one lower threshold for each path, in which case the lower threshold is selected from a database of lower thresholds using the path of the connection as an index.

The present invention also provides a method of assigning a starting slot to a connection through a port in a network element of an Automatically Switched Optical Network. The port has a number of sequentially numbered slots. Beginning with the first slot and repeating for each slot in sequential order until an acceptable slot is found, it is determined whether each slot is an acceptable slot for the connection. If a slot is an acceptable slot for the connection, the slot is assigned as the starting slot of the connection. The first slot may be the slot having the lowest slot number. The first slot may alternatively be the slot having the highest slot number. In one embodiment, whether a slot is an acceptable slot may be determined by determining whether there are sufficient contiguous free slots including and following the slot to accommodate a requested bandwidth of the connection. In another embodiment, whether a slot is an acceptable slot may be determined by determining whether there are sufficient contiguous free slots including and following the slot to accommodate a requested bandwidth of the connection, and whether a provisioned configuration indicates that the slot has a number which may be assigned to the connection.

The present invention also provides a method of relaying a notification of a fault in an Automatically Switched Optical Network having a first Optical Connection Controller (OCC) and at least one other OCC. The first OCC receives the notification of the fault, and relays the notification of the fault to all of the at least one other OCCs.

The present invention also provides a method of by which an Optical Connection Controller (OCC) relays a notification of a fault in an Automatically Switched Optical Network. The OCC receives the notification of the fault, and determines whether the notification has previously been relayed. If the notification has not previously been relayed, the OCC relays the notification to each OCC within a set of OCCs. The set of OCCs may include each neighbouring OCC to which the OCC is linked. In one embodiment, the OCC may determine whether the notification has previously been relayed by determining a message identification of the notification and comparing the message identification with a stored message identification. If the message identification is equal to the stored message identification, the OCC determines that the notification has already been relayed. If the message identification is not equal to the stored message identification, the OCC determines that the notification has not already been relayed and replaces the stored message identification with the message identification.

The present invention also provides a method of selecting a path between a network element and a destination in an Automatically Switched Optical Network having links interconnecting nodes. A database of paths between the network element and the destination is maintained, and a path is selected from the database. The method may also include generation of the database of paths. For each path to be determined, none or more of the links may eliminated from a model of the Network. A Dijkstra computation may be performed on the model of the Network, in which the none or more of the links have been eliminated, using bandwidth availability along each link as a cost function. From the Dijkstra computation, a shortest path to the destination may be selected and stored in the database in association with the destination.

The invention also provides an Optical Connection Controller in an Automatically Switched Optical Network. The OCC determines that a port is acceptable for new connections until the port load of the port reaches an upper threshold, after which it is determined that the port is not acceptable for new connections until the port load falls below a lower threshold. The OCC also assigns a starting slot to a connection such that the starting slot is as close to a first slot as permitted by a bandwidth requirement of the connection.

The methods and apparatus allow efficient bandwidth management of optical connections by implementing threshold-based load balancing of ports. Path restoration is improved by flooding of a fault notification throughout the control plane of the network rather than by determining which particular OCCs should be sent the fault notification, and by storing alternate shortest paths in a database.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
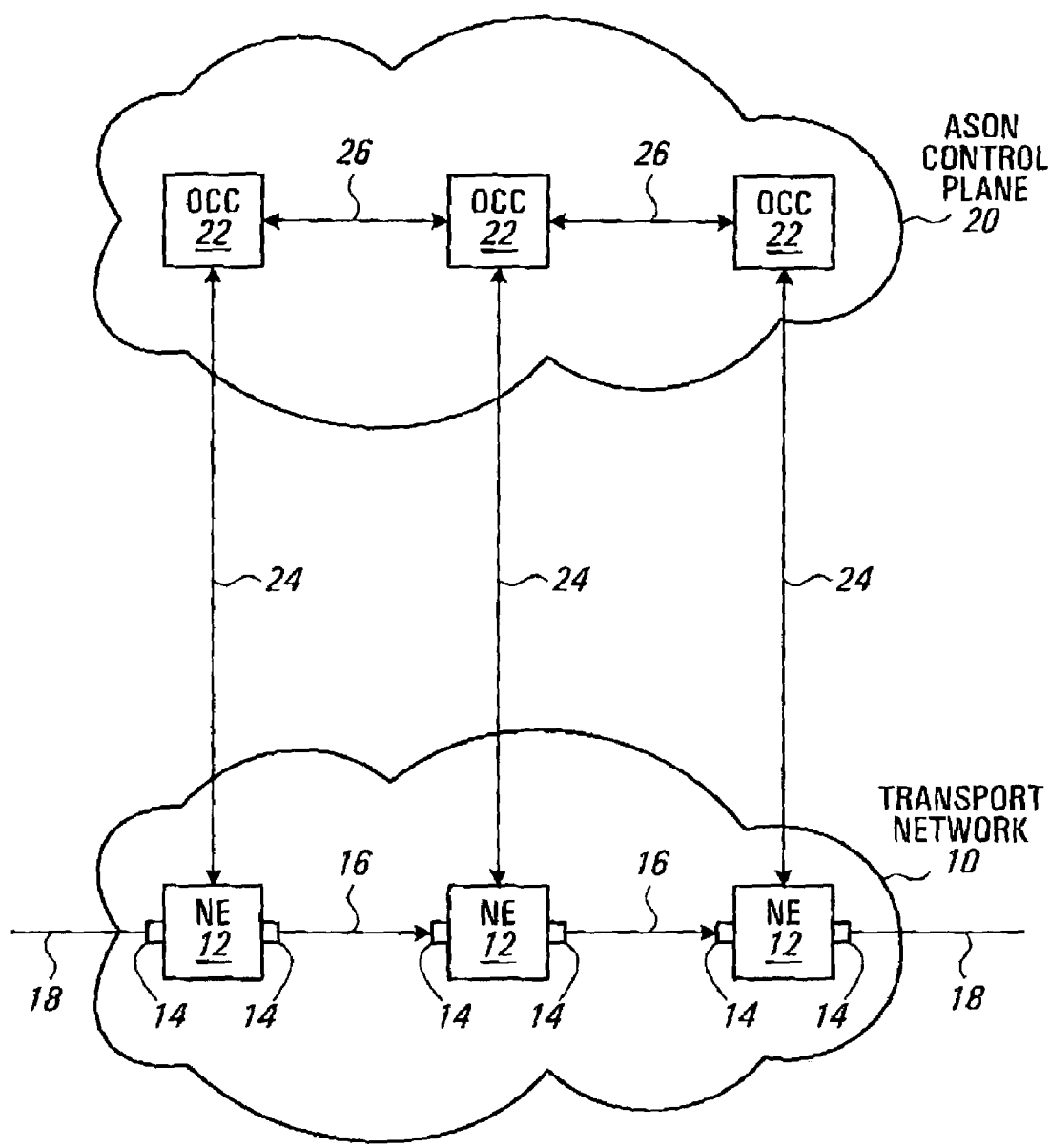
FIG. 1 is a block diagram of an automatically switched optical network.

Referring to FIG. 1, a block diagram of an example Automatically Switched Optical Network (ASON) is shown. A transport network 10 includes a plurality of network elements (NEs) 12 (there being three shown in FIG. 1). Each network element 12 includes one or more ports. A plurality of optical links 16 interconnect the network elements 12, each optical link connecting to a pair of ports 14. Internetwork links 18 may be present, connecting the transport network 10 to other networks.

A control plane 20 includes one or more Optical Connection Controllers (OCCs) 22, each of which is coupled to at least one network element 12 through a Connection Control Interface 24. Each OCC 22 is responsible for configuring and provisioning the network elements 12 to which it is coupled. Each OCC 22 includes software for making various decisions with respect to the transport network 10. As examples, the software located on the OCCs 22 is responsible for discovering network topology, for responding to faults, and for setting up connections. It should be noted that although FIG. 1 shows each OCC being responsible for only one network element, an OCC may alternatively be responsible for (and coupled to) more than one network element.

The OCCs 22 are interconnected through ASON control Node-Node Interfaces 26, allowing the OCCs 22 to send control plane messages to each other. The OCCs 22 are also typically coupled to Operations, Administration, Maintenance and Provisioning equipment, not shown in FIG. 1. Additionally, some OCCs may be coupled to other networks in order to allow control plane messages to be exchanged between networks.

Each OCC 22 includes functionality for establishing and maintaining connections. When a new connection is being established through the transport network, some OCCs will determine whether a port on a network element for which the OCC is responsible can accommodate the connection. This may be determined for a number of reasons. For example, a routing mechanism may need to know whether the network element has any acceptable ports for connection to a second network element. As another example, once the routing mechanism has determined that the connection is to pass from the network element to a second network element, the OCC may need to determine through which of several ports connected to the second network element the connection should be established.

One embodiment of the invention provides a method of determining an acceptability of a port for a requested connection. Threshold-based load balancing is achieved by determining that a port having a variable port load is acceptable for new connections until the port load reaches an upper threshold, after which it is determined that the port is not acceptable for new connections until the port load falls below a lower threshold.

Generally, an OCC determines an acceptability of a port for a connection in an ASON by comparing a current port load of the port with each of the lower threshold and the upper threshold. If the current port load is below the lower threshold, the OCC determines that the port is acceptable. If the current port load is above the upper threshold, the OCC determines that the port is not acceptable. If the current port load is between the lower threshold and the upper threshold, the OCC determines whether the current port load was most recently above the upper threshold or below the lower threshold. If the current port load was most recently above the upper threshold, the OCC determines that the port is not acceptable. It the current port load was most recently below the lower threshold, the OCC determines that the port is acceptable. This allows a hysteresis effect in that if the current port load is between the lower threshold and the upper threshold the OCC only allows the connection if the current port load was more recently below the lower threshold than above the upper threshold. This prevents rapid switching of the port from an available state to an unavailable state.

Figure 2:
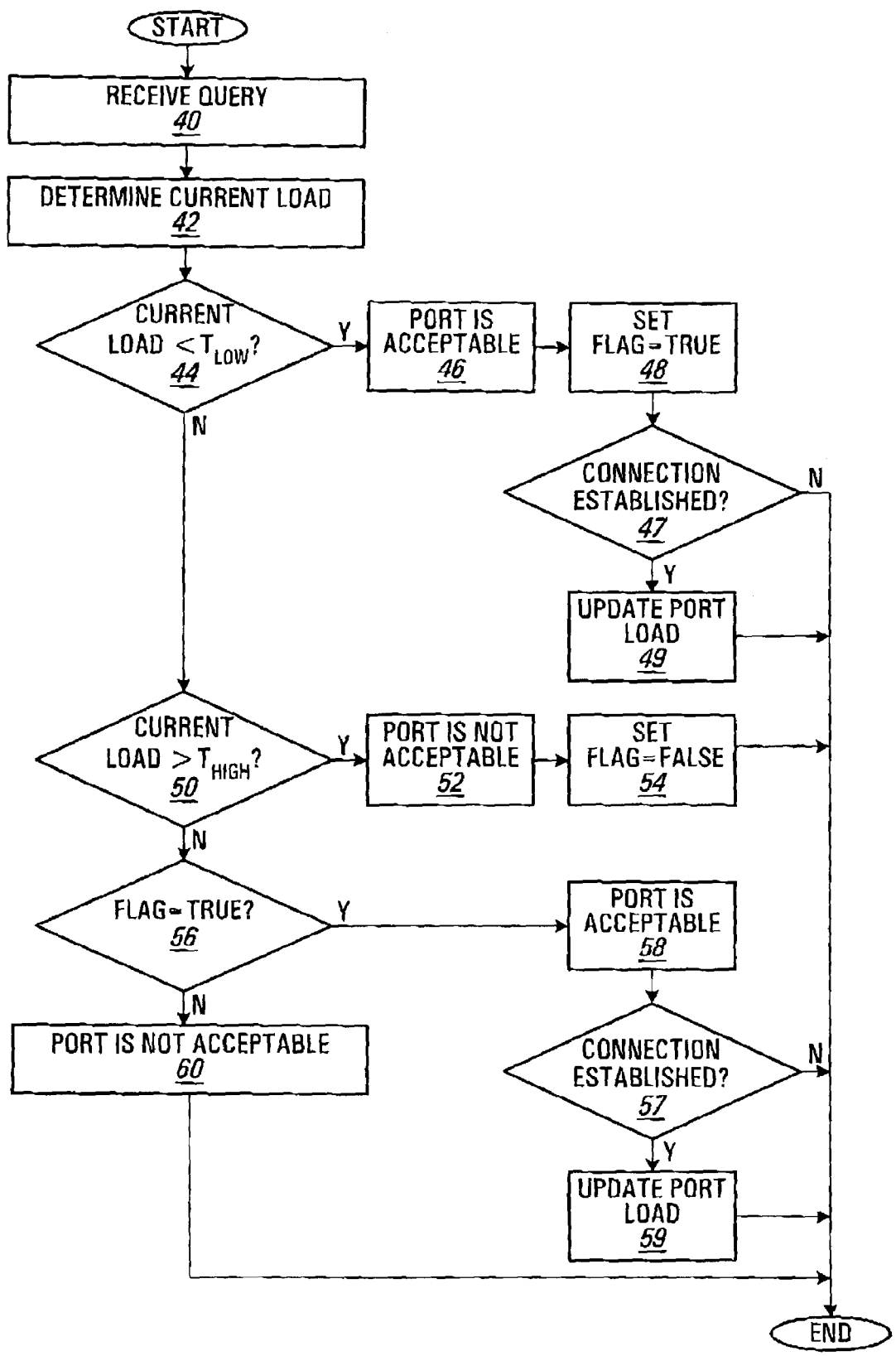
FIG. 2 is a flowchart of a method by which an Optical Connection Controller (OCC) of FIG. 1 determines whether a connection can be established through a port, according to one embodiment of the invention.

Referring to FIG. 2, a flowchart of a method by which an OCC determines whether to establish a connection through a port according to one embodiment of the invention is shown. The OCC maintains a flag for each port of the network element, each flag having a value of either "True" or "False". The method shown in FIG. 2 is executed when the OCC must determine whether a connection can be established through a port. At step 40 the OCC receives a query from a requesting process as to whether the port is available for establishment of a connection. The requesting process may be any process within the network, including at the OCC itself, attempting to establish a connection through the port. At step 42 the OCC determines a current port load. This may be done by maintaining a port load database listing the current port load of each port for which the OCC is responsible. If such a port load database is used, the OCC must update the port load database upon establishment or cancellation of a connection. Updating of the port load database may be carried out by the same process that determines the acceptability of a port for a connection, or by another process.

At step 44 the OCC compares the current port load with a lower threshold. If the current port load is less than (or alternatively, less than or equal to) the lower threshold, then the port has sufficient unused capacity to accommodate a new connection. At step 46 the OCC signals to the requesting process that the port is acceptable for the connection. At step 48 the OCC sets the value of the flag to be "True". Even though the OCC has determined that the port is acceptable, there may be other reasons why the connection is not established through the port. For example, a separate process may determine that no acceptable slot number can be assigned to the connection (as described below), possibly due to lack of capacity. If a port load database is used to determine the current port load at step 42, and if the process for determining acceptability of the port is responsible for updating the port load database, then at step 47 the OCC awaits confirmation as to whether the connection was actually established through the port. If so, then at step 49 the OCC updates the port load database to reflect the new current port load, taking into account the connection which was established.

If the current port load is not less than (or alternatively, not less than or equal to) the lower threshold, then at step 50 the OCC compares the current port load with an upper threshold. If the current port load is greater than (or alternatively, greater than or equal to) the upper threshold, then the port is approaching its maximum capacity. At step 52 the OCC signals to the requesting application that the port is not acceptable for the connection. At step 54 the OCC sets the value of the flag to "False".

If the current port load is not greater than (or alternatively, not greater than or equal to) the upper threshold, then the current port load lies between the lower threshold and the upper threshold. A decision as to whether to allow the connection will depend on whether the current load has most recently been above the upper threshold or below the lower threshold, a decision which can be made using the value of the flag. At step 56 the OCC examines the value of the flag. If the value of the flag is "True", then at step 58 the OCC signals to the requesting process that the port is acceptable for the connection. If a port load database is used to determine the current port load at step 42, and if the process for determining acceptability of the port is responsible for updating the port load database, then at step 57 the OCC awaits confirmation as to whether the connection was actually established through the port. If so, then at step 59 the OCC updates the port load database to reflect the new current port load taking into account the connection which is being allowed.

If at step 56 the value of the flag is "False", then the current port load was most recently above the upper threshold rather than below the lower threshold. At step 60 the OCC signals to the requesting process that the port is unacceptable for the connection.

As an alternative to maintaining a port load database, the OCC may determine the current port load at step 42 by exchanging standard signalling messages with the network element on which the port is located.

In one embodiment, the port load database lists a current port load for the port for each of a plurality of destinations. The query from the requesting process received by the OCC at step 40 includes a port number and a destination. The OCC determines the current port load at step 42 using a destination of the connection as an index to the port load database. In another embodiment, the port load database lists a current port load for the port for each of a plurality of paths. The query from the requesting process received by the OCC at step 40 includes a port number and a path. The OCC determines the current port load at step 42 using a path of the connection as an index to the port load database. In either of these embodiments, the OCC may also maintain a threshold database having a plurality of lower thresholds and a plurality of upper thresholds. The OCC determines which lower threshold and which upper threshold to use at steps 44 and 50 using the destination of the connection or the path of the connection as an index to the threshold database. Monitoring port loads as a function of destination or paths allows a routing process to balance loads throughout the entire transport network plane.

Once an OCC determines that a port is acceptable for a connection with respect to the current port load and to the thresholds, the OCC may assign slots within the port to a new connection. In another embodiment of the invention, the OCC assigns slots in a way which minimizes fragmentation of the assigned slots, by assigning a starting slot to a connection such that the starting slot is as close to a first slot as permitted by a bandwidth requirement of the connection. Slots within the port are numbered sequentially. Broadly, when the OCC receives a request for a connection, the OCC begins with a first slot (being the slot at either end of the numbered slots, i.e. the slot having the lowest number or the slot having the highest number), and repeatedly determines for each slot in sequential order whether the connection can be assigned to the slot, until an acceptable slot is found. If the OCC finds an acceptable slot having sufficient contiguous free slots and which is not prohibited for other reasons (such as provisioned configurations restricting certain connection sizes to specified slot numbers) then the OCC assigns the acceptable slot as a starting slot of the connection.

Figure 3:
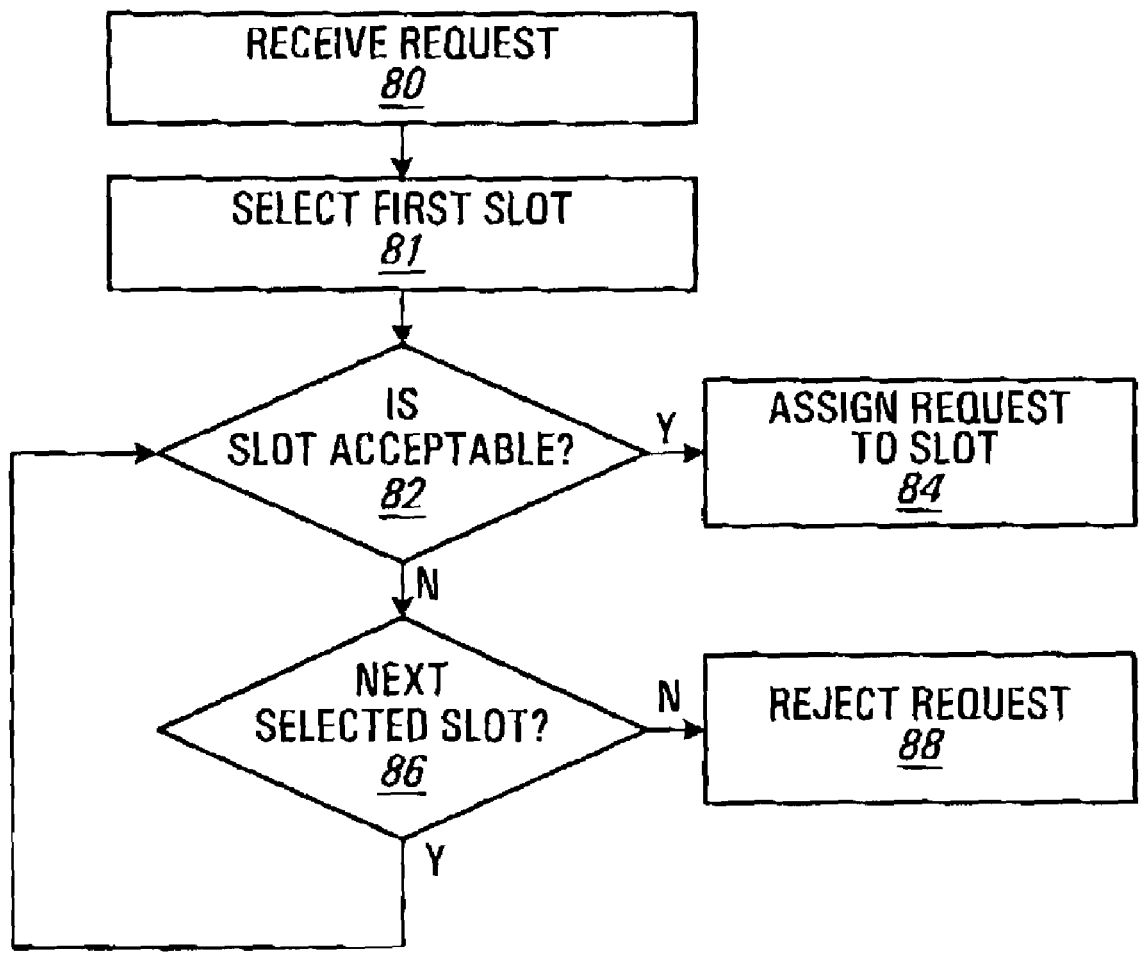
FIG. 3 is a flowchart of a method by which an OCC of FIG. 1 assigns a starting slot to a connection, according to one embodiment of the invention.

Referring to FIG. 3, a flowchart of a method by which an OCC assigns a starting slot to a connection according to one embodiment of the invention is shown. At step 80 the OCC receives from a requesting process (which may be within the OCC) a request for a starting slot for a connection. At step 81 the OCC selects the slot having a slot number of "1" as a selected slot.

At step 82 the OCC determines whether the selected slot is an acceptable slot for assignment to the connection. To make this determination, the OCC determines whether there are sufficient contiguous free slots, including and following the next slot, to accommodate a requested bandwidth of the connection. For example, if the connection is an OC-48 connection, the OCC will determine that next slot is an acceptable slot only if the next slot and the succeeding forty-seven slots are free. The OCC may additionally determine from a provisioned configuration whether the selected slot has a slot number which may not be assigned to the connection, based on the size of the connection. For example, the provisioned configuration may specify that OC-48 connections can only be assigned a starting slot having a slot number of "1", "49", "97", or "145".

If at step 82 the OCC determines that the selected slot is an acceptable slot for assignment to the connection, then at step 84 the OCC returns the number of the selected slot to the requesting process. If at step 82 the OCC determines that the selected slot is an acceptable slot for assignment to the connection, then the OCC attempts to select a next selected slot at step 86 and determines whether the next selected slot is an acceptable slot at step 82. If the OCC ever determines at step 86 that there is not a next selected slot (for example, if there are no more slots to select) then the connection cannot be accommodated within the port, and the OCC informs the requesting process at step 88 that the connection cannot be accommodated.

This method helps avoid fragmentation in the port, by ensuring that connections are assigned to free slots having the lowest possible slot numbers. This means that connections will tend to be grouped together, leaving a greater number of contiguous free slots. Of course, the method could also assign connections to free slots having the highest possible slot number. In such an embodiment, the OCC would select the slot having the highest slot number at step 81, and would select a next selected slot at step 86 by choosing slots having successively lower slot numbers.

Figure 4:
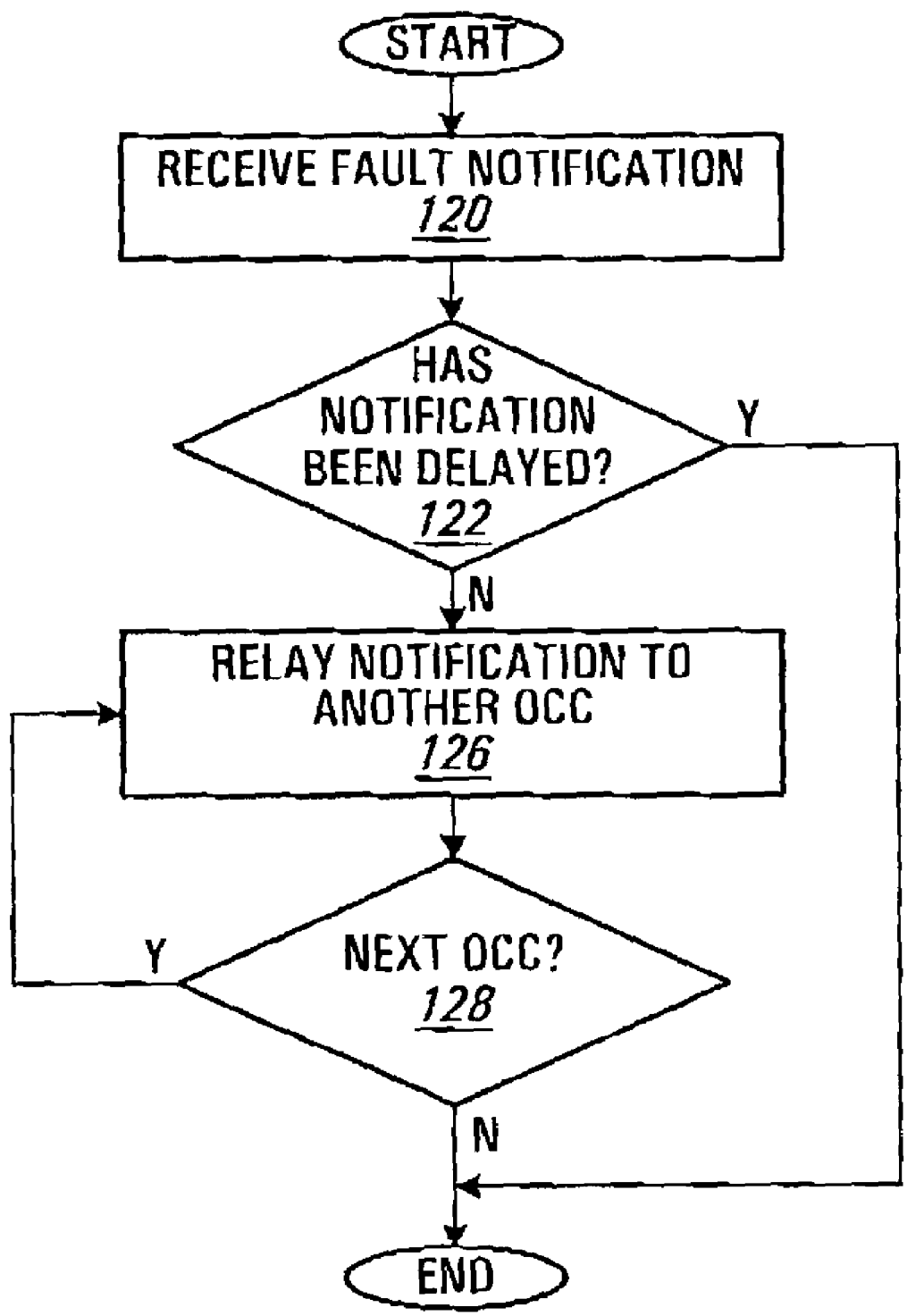
FIG. 4 is a flowchart of a method by which the OCCs of FIG. 1 relay notification of a fault, according to one embodiment of the invention.

Once a connection is established, the OCC generally monitors and addresses failure of the connection. When a link connected to a network element for which an OCC is responsible fails, the OCC receives a fault notification identifying the failed link. In another embodiment of the invention, the OCC then relays the fault notification to all other OCCs within the network. Referring to FIG. 4, a flowchart of a method by which an OCC relays fault notification to neighbouring OCCs according to one embodiment of the invention is shown. If all OCCs within the network implement the method described with reference to FIG. 4, then the fault notification will eventually be relayed to all OCCs within the network. At step 120 the OCC receives a fault notification identifying a failed link. The fault notification is initially received from a network element to which the link is connected and for which the OCC is responsible. Thereafter, the fault notification is received by an OCC from a neighbouring OCC.

At step 122 the OCC determines whether the OCC has already relayed the notification of the fault to other OCCs. This may be done using any method of preventing infinite looping of message passing. For example, if each fault notification includes a message identification, the OCC may store the message identification of a fault notification as a stored message identification. When the OCC receives a new fault notification, the OCC compares the message identification of the new fault notification with the stored message identification. If the message identification of the new fault notification is the same as the stored message identification, then the new fault notification has already been relayed by the OCC and has been received again due to circular relaying of the fault notification within the network. In such a case, the OCC ignores the fault notification, to prevent the fault notification from being passed repeatedly around the control plane.

If the OCC determines at step 122 that the OCC has not already relayed the fault notification to other OCCs, then at step 126 the OCC sends the fault notification to one of a set of OCCs, the set of OCCs being particular (though not necessarily unique) to the OCC. The set of OCCs may be any set of OCCs, as long as the union of the sets of OCCs for all OCCs include all OCCs in the control plane. In other words, each OCC in the control plane must be included in at least one set of OCCs. As one example, the set of OCCs may consist of all neighbouring OCCs of the OCC, in other words all those OCCs to which the OCC is directly linked. As another example, in a ring topology, the set of OCCs may consist of the neighbouring OCC in either the upstream or the downstream direction around the ring.

The OCC sends the fault notification to the one of the set of OCCs using any suitable signalling, for example the Constraint-based Routing Label Distribution Protocol. The fault notification includes a standard link designator specifying which link has failed. The OCC determines at step 128 whether there is a next OCC in the set of OCCs. If so, then the OCC sends the fault notification to the next OCC in the set of OCCs at step 126. If on the other hand there is no next OCC in the set of OCCs at step 128, then the OCC has finished relaying the fault notification.

Although the method of FIG. 4 is initially executed by the OCC responsible for the network element to which the failed link is coupled, the method is then executed by each OCC which receives the fault notification. In this way, the fault notification is eventually relayed to all OCCs within the control plane.

Figure 5:
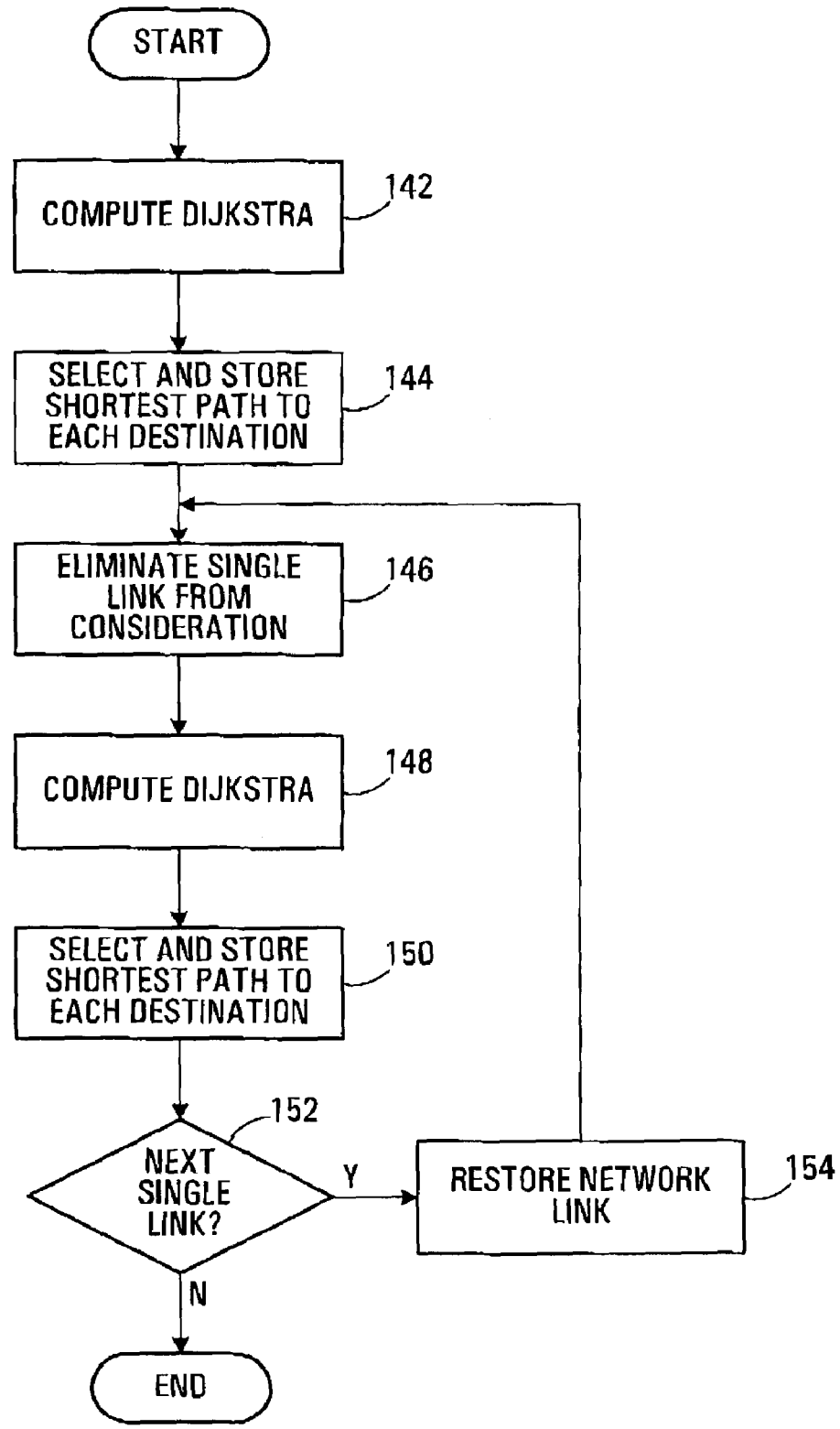
FIG. 5 is a flowchart of a method by which an OCC of FIG. 1 generates a database of shortest paths, according to one embodiment of the invention.

In order to deal with a failed link, an OCC may be required to determine an alternate path to a destination. The OCC may also be required to determine a path to a destination when a new connection is being established. In order to facilitate this, the OCC maintains a database of shortest paths. The shortest paths are between the network element for which the OCC is responsible ("the OCC's network element") and each of one or more destinations, there being one or more shortest paths stored for each destination. Referring to FIG. 5, a flowchart of a method by which an OCC generates a database of shortest paths according to one embodiment of the invention is shown. At step 142 the OCC performs a Dijkstra computation on a model of the network using bandwidth availability along each link as a cost function. At step 144, based on the Dijkstra computation the OCC selects and stores a shortest path to each destination in the database so as to associate a shortest path with each destination.

At step 146 the OCC eliminates a single link from its model of the network. This simulates a failure of the link. At step 148 the OCC performs a new Dijkstra computation on the model of the network in which the single link has been eliminated again using bandwidth availability as a cost metric. At step 150 the OCC selects a shortest path to each destination, and stores each shortest path in the database. At step 152 the OCC determines whether there exists a next link. If a next link exists at step 152, the OCC restores the network model to full operation at step 154, that is, restores the link that was previously eliminated at step 146. The OCC then eliminates the next link at step 146, and determines a new set of shortest paths.

If at step 152 there is no next link, then a shortest path has been computed and stored for each destination for when the network is fully operational, and for when each link has failed. When an actual failure occurs in the network and the OCC must determine a new shortest path to a destination, the OCC needs only to consult the database to determine which path to use. This can be done more quickly than computing a shortest path only when required to do so.

If the OCC is responsible for more than one network element, then the OCC generates and maintains a database of shortest paths for each network element for which the OCC is responsible.

The method by which the OCC generates a database of shortest paths may be modified so that the OCC also computes a shortest path to each destination by eliminating each combination by two (or more) links from consideration. However, the number of such combinations may become quite large, and the cost of performing a greater number of computations should be balanced against the likelihood of two or more nodes failing simultaneously. In addition, the method by which the OCC generates a database of shortest paths may be modified so that the OCC also computes a shortest path to each destination by eliminating one or more nodes from consideration. Eliminating a node from consideration effectively eliminates one or more links.

The OCC uses the database of available shortest paths whenever a link or a node fails. When the OCC receives a fault notification identifying a link or a node in which a fault has occurred, the OCC re-routes connections which use the link or the node in which the fault has occurred. The OCC consults the database to determine an alternate path for each connection affected by the fault, the alternate path being preferably the shortest available path. Because the shortest paths are stored in a database rather than computed at the time of link or node failure, an alternate path can be provided quickly and delay in restoration of connections is minimized.

Methods described by flowcharts which are logically equivalent to the flowcharts described above are within the scope of the present invention. For example, the steps 44 and 50 of FIG. 2 of comparing the current port load with the lower threshold and the upper threshold respectively may be carried out in the reverse order. The methods may be carried out by any computing apparatus within an OCC. The logic of the methods may be in the form of circuitry, such as internal circuitry of one or more processors, or in the form of instructions, such as in software loaded into computer memory.

Any of the methods described above may be implemented alone on an OCC. Alternatively, any combination of the methods described above may be implemented on an OCC, either as separate processes or as any combination of joint processes.

What has been described is merely illustrative of the application of the principles of the invention. Other arrangements and methods can be implemented by those skilled in the art without departing from the spirit and scope of the present invention.

We claim:

1. A method of determining an acceptability of a port for a connection in an Automatically Switched Optical Network, the port having a current port load, the method comprising:

if the current port load is below a lower threshold, determining that the port is acceptable; if the current port load is above an upper threshold, determining that the port is not acceptable; and if the current port load is between the lower threshold and the upper threshold, determining whether the current port load was most recently above the upper threshold or below the lower threshold, and:

if the current port load was most recently above the upper threshold, determining that the port is not acceptable; and if the current port load was most recently below the lower threshold, determining that the port is acceptable; wherein determining whether the current port load was most recently above the upper threshold or below the lower threshold comprises:

maintaining a value of a flag by setting the value of the flag to a first value if the current port load falls below the lower threshold and setting the value of the flag to a second value if the current port load reaches the upper threshold;

if the value of the flag is equal to the first value, determining that the current port load was most recently below the lower threshold; and if the value of the flag is equal to the second value, determining that the current port load was most recently above the upper threshold.

2. The method of claim 1 wherein the step of determining a current port load comprises signalling a network element on which the port is located.

3. The method of claim 1 further comprising maintaining a port load database for storing the current port load, and wherein determining a current port load comprises consulting the port load database using the port as an index.

4. The method of claim 3 further comprising updating the port load database to take into account newly established connections.

5. The method of claim 3 wherein maintaining a port load database comprises storing one current port load for each of a plurality of destinations, and wherein the step of consulting the port load database further uses a destination of a connection as an index.

6. The method of claim 5 further comprising: maintaining a database of lower thresholds; and selecting the lower threshold from the database of lower thresholds using the destination of the connection as an index.

7. The method claim 3 wherein maintaining the port load database comprising one current port load for each of a plurality of paths, and wherein the step of consulting the port load database further uses a path of a connection as an index.

8. The method of claim 7 further comprising: maintaining a database of lower thresholds; and selecting the lower threshold from the database of lower thresholds using the path of the connection as an index.

9. An Optical Connection Controller adapted to carry out the method of claim 1.

10. A processor comprising instructions for carrying out the method of claim 1.

* * * * *